(12) United States Patent
Whigham

(10) Patent No.: US 6,584,309 B1
(45) Date of Patent: Jun. 24, 2003

(54) VENDING MACHINE PURCHASE VIA CELLULAR TELEPHONE

(75) Inventor: Roger Chris Whigham, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/465,359

(22) Filed: Dec. 16, 1999

(51) Int. Cl.$^7$ ................................................ H04M 3/42
(52) U.S. Cl. ...................................... 455/414; 455/407
(58) Field of Search ................................ 455/414, 407, 455/408; 705/40

(56) References Cited

U.S. PATENT DOCUMENTS

| | | | |
|---|---|---|---|
| 3,947,882 A | 3/1976 | Lightner | 360/92 |
| 4,884,212 A | 11/1989 | Stutsman | 364/479 |
| 5,138,650 A * | 8/1992 | Stahl et al. | 379/61 |
| 5,339,250 A | 8/1994 | Durbin | 364/479 |
| 5,450,938 A | 9/1995 | Rademacher | 194/206 |
| 5,640,447 A | 6/1997 | Fonseca | 379/144 |
| 5,668,876 A | 9/1997 | Falk et al. | 380/25 |
| 5,704,517 A | 1/1998 | Lancaster, Jr. | 222/2 |
| 5,769,269 A | 6/1998 | Peters | 221/7 |
| 5,798,931 A | 8/1998 | Kaehler | 364/479.01 |
| 5,831,860 A | 11/1998 | Foladare et al. | 364/478.07 |
| 5,850,599 A * | 12/1998 | Seiderman | 455/406 |
| 5,860,362 A | 1/1999 | Smith | 101/494 |
| 5,915,023 A * | 6/1999 | Bernstein | 380/24 |
| 6,038,491 A * | 3/2000 | McGarry et al. | 700/231 |
| 6,186,396 B1 * | 2/2001 | Crandall, Jr. | 235/379 |
| 6,193,154 B1 * | 2/2001 | Phillips et al. | 235/381 |
| 6,255,942 B1 * | 7/2001 | Knudsen | 340/506 |
| 6,295,449 B1 * | 9/2001 | Westerlage et al. | 455/422 |
| 6,324,520 B1 * | 11/2001 | Walker et al. | 705/16 |

FOREIGN PATENT DOCUMENTS

| | | | | |
|---|---|---|---|---|
| EP | 0 708 547 A2 | 4/1996 | | |
| EP | 0 780 802 A2 | 6/1997 | | |
| JP | 152773 | * | 5/1994 | G06F/15/21 |
| JP | 11-184928 | * | 7/1999 | G06F/17/60 |
| WO | WO 98/06214 | 2/1998 | | |
| WO | WO 99/22346 | 5/1999 | | |

OTHER PUBLICATIONS

Abstract of Japanese Publication No. 08227478 (Hirose Fumitada).
Abstract of Japanese Publication No. 08249530 (Sanyo Electric Co., Ltd.).
Abstract of Japanese Publication No. 10149400 (Hitachi Ltd; Hitachi Asahi Electron).

* cited by examiner

*Primary Examiner*—Vivian Chin
*Assistant Examiner*—Tu X Nguyen
(74) *Attorney, Agent, or Firm*—Sutherland Asbill & Brennan LLP

(57) ABSTRACT

There is disclosed a system and method for purchasing a product from an automatic vending machine by means of a consumer's cellular telephone. The consumer requests a product available from the vending machine by dialing a specified telephone number which connects the consumer's cellular telephone to a server operated by a billing agency. The billing agency may include the provider of the product, the telephone company that provides the cellular telephone service, a credit card company, or a bank that has issued a debit card. The server recognizes the request for the product, creates a transaction record, and communicates a vend code to the consumer. The transaction record includes a billing record that the billing agency uses to bill the consumer for the requested product and an inventory record that the product provider uses in connection with restocking the vending machine. Upon receiving the vend code from the server, the consumer transmits the vend code to the vending machine. The vend code may be an RF code, an audible tone code, or a manual code. Upon receipt of the vend code from the consumer, the vending machine dispenses the requested product.

34 Claims, 2 Drawing Sheets

VENDING MACHINE PURCHASE VIA CELLULAR TELEPHONE

TECHNICAL FIELD

The present invention relates to purchasing a product from an automatic vending machine. More particularly, the present invention relates to the purchase of a product from an automatic vending machine by using a cellular telephone.

BACKGROUND OF THE INVENTION

Automatic vending machines have become ubiquitous in public places offering consumers a variety of products from soft drinks to gasoline to currency. Each vending machine typically vends more than one product and sometimes at different prices. Conventional vending machines accept coins, paper currency, credit cards, or debit cards. Vending machines that accept coin or paper currency often fail to accept the coins or currency offered. Such vending machines also require that the consumer have readily available the currency required.

Vending machines that accept credit cards and debit cards are generally limited to dispensing gasoline at service stations or dispensing currency at automatic teller machines. In each circumstance, those vending machines require an online connection from the vending machine to the credit or debit card issuer to verify the availability of funds or credit before the transaction at the vending machine can be completed. The online connection to the vending machine must be secure and must be a dedicated connection that is available on demand to insure satisfactory transactions in terms of speed and reliability.

SUMMARY OF THE INVENTION

The present invention eliminates the need for currency for a vending machine and also eliminates the need for a dedicated online connection between the vending machine and the issuer of a credit card or a debit card. Instead the system and method of the present invention allows a consumer to purchase a product from an automatic vending machine by using the consumer's cellular telephone, personal digital assistant (PDA), or similar wireless communication device as a link between the provider of the products in the vending machine and the vending machine.

The system of the present invention comprises an automatic vending machine, a cellular telephone, PDA, or similar communication device identified with the consumer, a cellular network for connecting the consumer's cellular telephone, PDA, or similar communication device to a server that is operated by a billing agency. The automatic vending machine offers one or more products for purchase by the consumer. The automatic vending machine includes a local receiver which responds to a vend code generated by the server and communicated to the vending machine via the consumer's telephone, PDA, or similar communication device.

In one embodiment the vending machine has a local RF receiver that receives the vend code from the consumer's cellular telephone over a local RF link. In a second embodiment, the vending machine has local microphone receiver that receives an audible tone or tones from the consumer's cellular telephone when the ear piece of the consumer's cellular telephone is held adjacent to the vending machine to establish a local audible link. In a third embodiment, the vending machine has a local infrared (IR) receiver that receives the vend code from the consumer's PDA over a local IR link. In a fourth embodiment, the vending machine has a key pad or other manual input device so that the consumer can receive the vend code as an alpha-numeric sequence orally via the cellular telephone or graphically via the PDA and manually input the vend code into the vending machine. The automatic vending machine has been programmed to dispense a particular product in response to the vend code received by the local receiver of the vending machine.

As indicated, the system also includes the consumer's cellular telephone, PDA, or other communication device. The cellular telephone, PDA, or other communication device is capable of establishing a connection with the server via a cellular network. In one embodiment, the consumer's cellular telephone has a local RF transmitter that allows the consumer's cellular telephone to communicate over a short range with the RF receiver in the automatic vending machine and thus transmit the vend code to the automatic vending machine. In the second embodiment, the consumer's cellular telephone uses its ear piece or speaker to transmit the vend code as an audible tone or tones to the microphone receiver in the vending machine. In the third embodiment, the consumer's PDA may be equipped with an IR transmitter that transmits the vend code to the IR receiver in the vending machine over a local IR link. In the fourth embodiment, the consumer orally receives the vend code as an alpha-numeric sequence via the consumer's cellular telephone, or the consumer graphically receives the vend code as an alpha-numeric sequence via the consumer's PDA. In both cases, the vend code is transmitted manually by the consumer to the vending machine.

The server is operated by a billing agency. The billing agency may include the telephone company that provides the consumer's cellular telephone service, a credit card issuer, a bank that has issued a debit card, or the provider of the selected product from the vending machine. The server is a general purpose digital computer that is capable of receiving a call from the consumer's cellular telephone, PDA, or other personal communication device and extracting the consumer's request for a particular product from information provided by the consumer via the cellular telephone, PDA, or other personal communication device. Once the server has determined the requested product, the server generates a vend code and produces a transaction record. The vend code is communicated to the consumer and then to the vending machine to authorize dispensing of the selected product as previously described. The transaction record includes a billing record and an inventory record. The billing record is sent to the billing agency for billing the consumer for the purchase of the product. The inventory record is sent to the product provider to facilitate restocking of the vending machine in the ordinary course.

The method of the present invention allows the consumer to purchase a product from a vending machine. When the consumer approaches the vending machine, the consumer is offered one or more products available from the vending machine. Such an offer is typically made by a display of the products along with information concerning the cost of the product and, in the case of the present invention, instructions on how to purchase the product by means of consumer's cellular telephone, PDA, or other personal communication device.

Once the consumer has selected the product he or she desires, the consumer places a telephone call via the consumer's cellular telephone, PDA, or other personal communication device to a telephone number indicated on the vending machine for the purchase of the particular product selected. The consumer's telephone call is completed to a server via a telephone network. The server may be associated with the provider of the telephone service, the provider of the selected product, or a third party billing agency. The server recognizes the call as being a request for a particular product based on the number called, the input of additional dialed digits after the call is connected, or a verbal response from the consumer.

Once the server has captured the information representing the request by the consumer for a particular product in the vending machine, the server generates a vend code which is transmitted via the telephone network back to the consumer via the consumer's cellular telephone, PDA, or other personal communication device as previously described.

In addition to generating and transmitting the vend code, the server also creates a transaction record indicating that the consumer has purchased the product requested. Transaction record includes a billing record for the consumer and an inventory record for the product provider. The billing record for the requested product is sent to a billing agency which may include the telephone company that provides the consumer's cellular telephone service, a credit card company, a debit card from a bank, or the product provider. The billing agency bills the consumer, and if the billing agent is not the product provider, the billing agency remits the collected funds to the product provider to pay for the requested product. The inventory portion of the record transaction is sent directly to the product provider so that the product provider can have an inventory record for determining when restocking of the vending machine is required. The inventory information and the billing information may also be collected by the product provider for use in connection with market research and assessment.

DETAILED DESCRIPTION OF EXEMPLARY EMBODIMENTS

Exemplary embodiments of the present invention will hereinafter be described with reference to the drawings, in which like numerals indicate like elements throughout the several figures.

Figure 1:
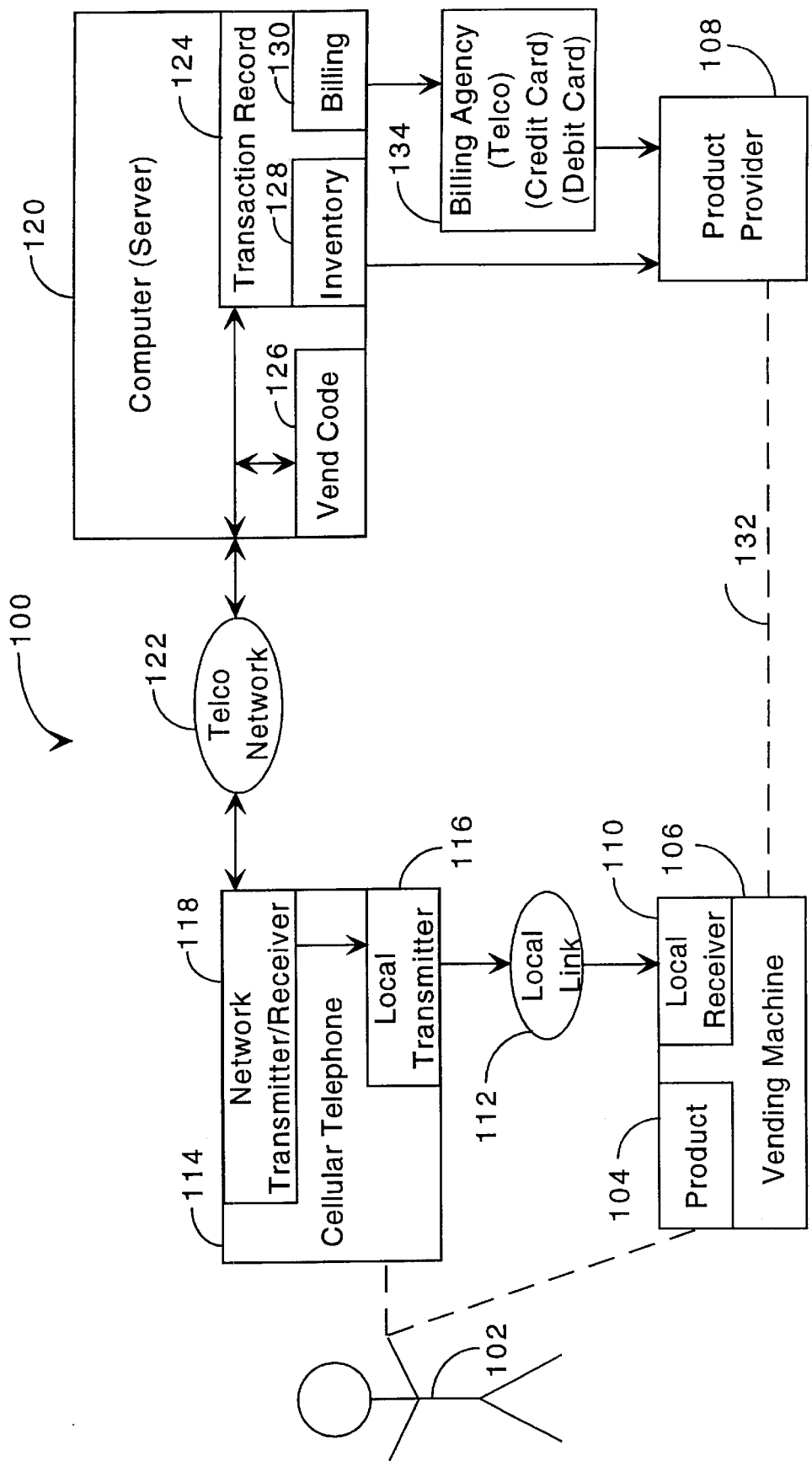
FIG. 1 is a diagram illustrating a system for vending a product from an automatic vending machine in response to a request from a consumer via a cellular telephone.

Turning to FIG. 1, there is shown the system 100 of the present invention. System 100 is configured to allow a consumer 102 to purchase a product 104 from a vending machine 106. The product 104 is offered for sale through the vending machine 106 by product provider 108. For the purposes of this invention, the term "product" means both products and services that may be offered through a vending machine.

The system 100 comprises vending machine 106 having a local receiver 110, a cellular telephone 114 associated with the consumer 102 and having a local transmitter 116 and a network transmitter/receiver 118, and a computer (server) 120. Unless otherwise indicated the term "cellular telephone" shall include a PDA, or other personal communication device. The consumer's cellular telephone 114 is connected to the vending machine 106 via the cellular telephone's local transmitter 116, local communication link 112, and the vending machine's local receiver 110. The consumer's cellular telephone 114 is also connected to the server 120 via the cellular telephone's network transmitter/receiver 118 and telephone network 122. The telephone network 122 is a conventional cellular telephone system which allows the consumer 102 to use his or her cellular telephone 114 to establish a dial up connection with server 120.

The server 120 performs three functions. First, the server 120 receives the consumer's call requesting a particular product 104 and from the call identifies a request for the product 104 in the vending machine 106. Second, upon identifying the request for the product 104, the server 120 creates a transaction record 124. Third, in response to the request for the product 104 in the vending machine 106, the server 120 generates a vend code 126 which authorizes the vending machine 106 to dispense the requested product 104 to the consumer 102.

The server 120 may identify the request for the product 104 in several ways. In one embodiment of the invention, each product 104 has a unique dial up number for requesting the product. The server 120 captures the dialed digits and recognizes the request for the product 104 based solely on the number called to establish the connection from the cellular telephone 114 to the server 120. In another embodiment, the server may issue a query to the consumer 102 once the connection between the cellular telephone 114 and the server 120 has been established. In response to the query, the consumer 102 can identify the desired product 104 by either dialing additional digits or by a verbal response which is decoded by voice recognition software on the server 120.

The transaction record 124 created by the server 120 in response to the request for the product 104 includes an inventory record 128 and a billing record 130. The inventory record 128, identifying the product 104 and the vending machine 106, is transmitted to the product provider 108 so that the product provider 108 can restock the vending machine 106 in the conventional fashion as indicated by line 132. The billing record 130 identifies the consumer 102 based on the consumer's association with the cellular telephone 114. The billing record 130 also includes price information and may include other information about the transaction such as time, date, and location of the vending machine 106. The billing record 130 is sent to a billing agency 134. The billing agency 134 may be the telephone company which provides the consumer 102 a bill for cellular telephone service on a regular basis. Alternatively, the billing agency 134 may be a credit card company, financial institution that has issued a debit card, or the product provider 108. Whatever billing agency 134 is authorized, the billing agency 134 bills the consumer 102 for the product 104 and collects the payment for the benefit of the product provider 108.

After the server 120 has generated the vend code 126 in response to the request received for the product 104, the vend code 126 is communicated to the consumer 102 via the telephone network 122 and the consumer's cellular telephone 114. The vend code 126 is in turn transmitted to the vending machine 106 via the local transmitter 116, the local link 112, and the local receiver 112 thereby authorizing the vending machine 106 to dispense the product 104.

In one embodiment of the invention, the local transmitter 116 of the cellular telephone 114 is an RF transmitter, and the local receiver 110 of vending machine 106 is an RF receiver. The vend code 126 is then transmitted by the local RF transmitter 116 of the cellular telephone 114 to the local RF receiver 110 of the vending machine 106 over local RF link 112. Upon receiving the vend code 126 at the local RF receiver 110 of the vending machine 106, the vend code authorizes the vending machine 106 to dispense the product 104 to the consumer 102.

In a second embodiment, the vend code 126 is sent from the server 120 to the cellular telephone 114 as an audible tone or a series of tones that appears at the ear piece speaker (local transmitter 116) of the cellular telephone 114. The local receiver 110 of the vending machine 106 is a microphone which receives the audible vend code from the speaker of the cellular telephone 114. The local link 112 is therefore created when the consumer 102 holds the ear piece speaker (local transmitter 116) of the cellular telephone 114 adjacent the microphone (local receiver 110) of the vending machine 106, and the vend code 126 is thereby transmitted over the audible local link 112 to the vending machine 106.

In a third embodiment, the vend code 126 is sent from the server 120 to the consumer's PDA 114. Upon receipt of the vend code 126, the consumer's PDA 114 activates its local IR transmitter and transmits the vend code 126 to the local IR receiver 110 in the vending machine 106 via the local IR link 112.

In a fourth embodiment, the vend code may be an alpha-numeric vend code 126 communicated orally to the consumer 102 via the consumer's cellular telephone 114 or graphically to the consumer 102 via the consumer's PDA 114. Particularly, the alpha-numeric vend code 126 may be created by voice synthesis at the server 120 and transmitted to the consumer 102 over the telephone voice link 122 to the consumer's cellular telephone 114. Upon hearing or seeing the alpha-numeric vend code 126, the consumer 102 inputs the alpha-numeric vend code 126 into the vending machine 106 via a keypad (local receiver 110) or other manual input device. Thus in the fourth embodiment, the local link 112 is the consumer.

Regardless of the form of the vend code 126 or the local link 112, the vending machine 126 is programmed to dispense the product 104 upon receiving the proper vend code 126. A unique vend code may be created and transmitted to the vending machine 106 for each product 104 available for vending machine 106. In a system having multiple vending machines, the vend code may be unique for each vending machine within the system. It should also be noted that in accordance with the system of the present invention, there is no dedicated communication link required between the vending machine 102 and the server 120 that authorizes the vending machine 106 to dispense the requested product 104.

Figure 2:
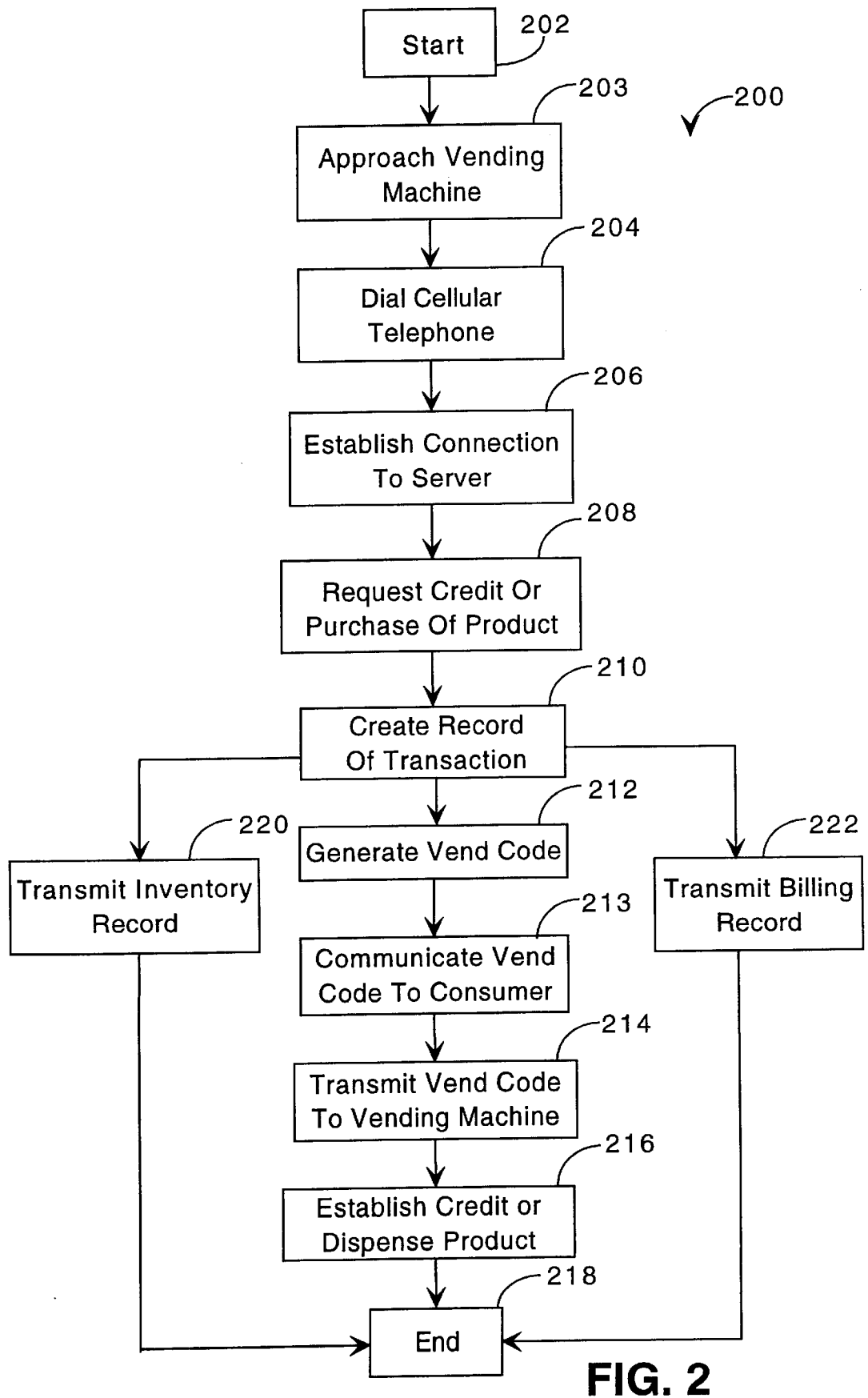
FIG. 2 is a flow chart illustrating a method for vending a product from an automatic vending machine in response to a request from a consumer via a cellular telephone.

Turning to FIG. 2, there is shown a method 200 which allows the consumer 102 to purchase the product 104 from the vending machine 106 by using his or her cellular telephone 114. The method 200 beings at step 202 and proceeds to step 203. At step 203, the consumer 102 approaches the vending machine 106 that has the product 104 that the consumer 102 wishes to purchase. From information displayed on or adjacent the vending machine 106, the consumer 102 is able to ascertain the identity of the product 104 that he or she desires. In addition, instructions for using the consumer's cellular telephone 114 to request and pay for the product 104 are displayed on or adjacent the vending machine 106. Such instructions include a telephone number to call to request the product 104 and perhaps an alpha-numeric identifier for the product 104.

From step 203 the method proceeds to step 204. At step 204, the consumer 102 in response to the instructions at the vending machine 106 dials his or her cellular telephone 114 to make a telephone connection between the cellular telephone 114 and the server 120 and via telephone network 122. At step 206, the server 120 answers the call, and a connection between cellular telephone 114 and server 120 is established via telephone network 122.

At step 208, the consumer 102 requests the product 104, and the server 120 identifies the product 104 requested by the consumer 102. A request at step 208 may be accomplished by several methods. First, each product in the vending machine 106 may have a unique dial up telephone number. Therefore, by dialing the designated telephone number for the requested product and by establishing the connection to the server 120, the server 120 is able to identify the requested product 104 based on capturing the number dialed to make the telephone connection.

Second, a single dial up number may be used for requesting all of the products 104 for the vending machine 106. In that case, once the connection to the server 120 has been made at step 206, the server 120, at step 208, may query the consumer 102 for additional information in order to identify the particular product 104 that is requested. Such additional information may include dialing of additional digits on the cellular telephone 114 or may employ voice recognition software so that the server 120 can recognize and process a voice request from the consumer 102.

Once the server 120 has received the information from the consumer 102 from which the server 120 can identify the requested product 104, the method moves to steps 210 and 212 in which the transaction record 124 is created (step 210) and the vend code 126 is generated step 212). Steps 210 and 212 may occur sequentially as shown in FIG. 2, in the reverse order from that shown in FIG. 2 or simultaneously.

With respect to the creation of a transaction record 124 at step 210, the server 120, having identified the requested product 104, creates the billing record 130 showing the sale of the product 104. The billing record 130 identifies the consumer 102 based on the consumer's association with the cellular telephone 114 that was used to make the call to the server 120. Such identification can be made using standard caller identification capabilities of the telephone network 122. The billing record 130 also includes the cost of the product 104 and may include other information such as the time and date of the purchase and the location of the vending machine 106.

From step 210, the method proceeds to step 222 where the billing record 130 is transmitted to the billing agency 134. As previously explained, the billing agency 134 may be the telephone company which provides the service for the cellular telephone 114, a credit card company which has been identified by the consumer 102 as the appropriate billing agency 134 for charges incurred as a result of purchasing the product 104 from the vending machine 106, a bank that has issued a debit card which likewise has been identified by the consumer 102 as being the appropriate billing agency 134 for purchases from vending machine 106, or the product provider 108 which has established a charge account for the consumer 102 for purchase of products such as product 104. Whatever billing agency is used the billing agency bills collects funds from the consumer 102 in accordance with the billing record 130 in the normal course of the billing agency's business. If the billing agency 134 is not the product provider 108, the collected funds (less the billing agency's charges) are remitted to the product provider 108 in payment for the product 104.

In addition to the billing record 130 at step 210, the server 120 creates an inventory record 128 which indicates that the vending machine 106 has had its inventory of the product 104 reduced by 1 unit. At step 220, the inventory record 128 is transmitted to product provider 108 so that the product provider 108 can restock the vending machine via conventional channel 132 (delivery truck, etc.) as necessary.

From step 210 the method proceeds to step 212. At step 212, the server 120 generates a vend code 126 which is use to authorize the vending machine 106 to dispense the product 104. At step 213, the vend code 126 is communicated to the consumer 102 via the telephone network 122 and the cellular telephone 114. Once the consumer 102 has received the vend code 126 at step 21, the method proceeds to step 214.

At step 214, the vend code 126 is transmitted by the consumer 102 to the vending machine 106. As previously explained, the vend code 126 may be transmitted to the vending machine 106 by means of the local RF transmitter 116 of the cellular phone 114, the RF link 112, and the local RF receiver 110 of the vending machine 106. Alternately at step 214, the vend code 126 may be an audible signal or tone which is transmitted from the ear piece of the cellular telephone 114 to a local microphone 110 at the vending machine 106. The vend code may be transmitted via a local IR transmitter 116, a local IR link 112, and a local IR receiver 110. Alternatively at step 214, the vend code 126 may be an alpha-numeric code which is communicated to the orally or graphically to the consumer 102. The consumer in turn manually enters the alpha-numeric vend code 126 into the vending machine 106 via a key pad or other manual entry device.

At step 216, the vending machine 106 recognizes the vend code as authorization to dispense the product 104 that the vending machine 106 has in its inventory. Once the vending machine 106 receives the appropriate vend code for the product 104, the vending machine 106 dispenses the product 104 to the consumer 102. The method ends at step 218.

The system 100 and method 200 of the present invention allow the consumer 102 to purchase the product 104 from the vending machine 106 by dialing a telephone number on the consumer's cellular telephone, PDA, or other personal communication device 114, by receiving a vend code 126 from the server 120, and by transmitting the vend code 126 to the vending machine 106. Thus, the system 100 and method 200 of the present invention eliminates the need for currency or for a dedicated communication link between the vending machine 106 and the product provider 108 or the billing agency 134.

What is claimed is:

1. A system for facilitating a credit-based purchase of a product by a consumer from a vending machine absent a dedicated online connection between the vending machine and a financial institution, the system comprising:
    a vending machine that has the product available for sale, wherein the vending machine comprises:
        a local receiver for receiving a vend code from the consumer via a local link; and
        means for dispensing the product in response to the receipt of the vend code;
    a server remote from and not in communication with the vending machine and accessible via a telephone network by a cellular telephone operated by the consumer;
    wherein the server receives from the cellular telephone via the telephone network a request for the purchase of the product from the vending machine, creates a transaction record for the request, and communicates the vend code to the cellular telephone,
    whereby the consumer may then transmit the vend code to the local receiver of the vending machine via the local link in order to authorize the vending machine to dispense the product without currency being provided to the vending machine.

2. The system of claim 1, wherein the cellular telephone accesses the server by dialing a number that corresponds to the product requested; and
    wherein the server determines the product requested by capturing the number dialed by the consumer.

3. The system of claim 1, wherein the server determines the product requested by interpreting one or more signals generated by the cellular phone.

4. The system of claim 1, further comprising a display that displays a telephone number to be called to request purchase of the product.

5. The system of claim 1, wherein the cellular telephone includes a local radio frequency transmitter;
    wherein the local receiver in the vending machine comprises a local radio frequency receiver; and
    wherein the vend code is transmitted from the local radio frequency transmitter to the local radio frequency receiver.

6. The system of claim 1, wherein the cellular telephone includes a local audio transmitter;
    wherein the local receiver in the vending machine comprises a local audio receiver; and
    wherein the vend code is transmitted from the local audio transmitter to the local audio receiver.

7. The system of claim 1, wherein the cellular telephone includes a local infrared transmitter;
    wherein the local receiver in the vending machine comprises a local infrared receiver; and
    wherein the vend code is transmitted from the local infrared transmitter to the local infrared receiver.

8. The system of claim 1, wherein the local receiver in the vending machine comprises a manual input device; and
    wherein the vend code is an alpha-numeric code communicated to the cellular telephone for manual input by the consumer into the manual input device.

9. The system of claim 1, wherein the transaction record includes a billing record that is posted to an account associated with the consumer.

10. A method for facilitating a credit-based purchase of a product from a vending machine absent a dedicated online connection between the vending machine and a financial institution comprising the steps of:
    at a server remote from and not in communication with the vending machine:
        receiving via a telephone network a call from a cellular telephone identified with a consumer, the call being for the purpose of requesting purchase of a product from the vending machine;
        based on the call, identifying the product and a purchase price associated with the product;
        in response to identifying the purchase price, creating a transaction record that includes a billing record that may be used to bill the consumer and to collect funds from the consumer in relation to the purchase price;
        in response to identifying the product, generating a vend code for instructing the vending machine to dispense the product; and
        transmitting the vend code to the cellular telephone via the telephone network,
    whereby the consumer may then input the vend code to the vending machine via a local link in order to receive the product therefrom without having to provide currency to the vending machine.

11. The method of claim 10, wherein at least a portion of the funds collected from the consumer are remitted to a provider of the vending machine.

12. The method of claim 10, wherein the call from the cellular telephone is initiated by dialing a telephone number that corresponds to the product; and wherein the product is identified based on the telephone number dialed by the consumer.

13. The method of claim 10, wherein the product is identified based on one or more input signals received from the cellular telephone during the call.

14. The method of claim 10, wherein the one or more input signals comprise one or more touch tone signals generated by the cellular phone in response to the consumer dialing additional numbers.

15. The method of claim 13, wherein the one or more input signals comprise one or more voice signals generated by the cellular phone in response to the consumer providing a verbal response.

16. The method of claim 10, wherein the consumer inputs the vend code to the vending machine by transmitting the vend code from the cellular telephone to the vending machine via a radio frequency link.

17. The method of claim 10, wherein the consumer inputs the vend code to the vending machine by transmitting the vend code from the cellular telephone to the vending machine as an audible signal.

18. The method of claim 10, wherein the consumer inputs the vend code to the vending machine by transmitting the vend code from the cellular telephone to the vending machine via an infrared link.

19. The method of claim 10, wherein the vend code comprises an alpha-numeric code.

20. The method of claim 10, wherein the consumer's cellular telephone has an associated account maintained by a provider of telephone services; and wherein the billing record is posted to the associated account in order to bill the consumer.

21. The method of claim 10, wherein the consumer has an associated credit account maintained by a financial institution; and wherein the billing record is posted to the associated credit account in order to bill the consumer.

22. The method of claim 10, wherein the consumer has an associated debit account maintained by a financial institution; and wherein the billing record is posted to the associated debit account in order to bill the consumer.

23. The method of claim 10, wherein the consumer has an associated charge account maintained by a provider of the vending machine; and wherein the billing record is posted to the associated charge account in order to bill the consumer.

24. The method of claim 10, wherein the call requesting purchase of the product further identifies the vending machine; and wherein the transaction record further comprises an inventory record that indicates that the product has been dispensed from the identified vending machine.

25. The method of claim 24, further comprising the step of transmitting the transaction record to a provider of the vending machine for reporting and analysis.

26. A server maintained by a billing agency for facilitating a credit-based purchase of a product from a vending machine absent a dedicated online connection between the vending machine and a financial institution comprising:

a communication device for receiving via a network a call from a cellular telephone identified with a consumer, the call being for the purpose of requesting purchase of a product from a vending machine that is remote from and not in communication with the server;

a memory storing product identifiers and associated product purchase prices; and a processor configured to execute computer-executable instructions for performing the steps of:

based on the call, accessing the memory to determine a product identifier and a purchase price associated with the product, in response to identifying the purchase price, storing in the memory a transaction record that includes a billing record that may be used to bill the consumer and to collect funds from the consumer in relation to the purchase price, in response to identifying the product, generating a vend code for instructing the vending machine to dispense the product, and instructing the communication device to transmit the vend code to the cellular telephone via the network, whereby the consumer may then input the vend code to the vending machine via a local link in order to receive the product therefrom without having to provide currency to the vending machine.

27. The system of claim 26, wherein at least a portion of the funds collected from the consumer are remitted to a provider of the vending machine.

28. The system of claim 26, wherein the call from the cellular telephone is initiated by dialing a telephone number that corresponds to the product; and wherein the product identifier is determined based on the telephone number dialed by the consumer.

29. The system of claim 26, wherein the product identifier is supplied by the consumer in the form of one or more signals generated by the cellular telephone during the call.

30. The system of claim 29, wherein the one or more signals comprise one or more touch tone signals generated by the cellular phone in response to the consumer dialing additional numbers.

31. The system of claim 29, wherein the one or more signals comprise one or more voice signals generated by the cellular phone in response to the consumer providing a verbal response.

32. The system of claim 26, wherein the consumer owns an account maintained by a third-party; and wherein the processor is further configured to instruct the communication device to transmit the billing record to the third-party for posting to the account in order to bill the consumer.

33. The system of claim 26, wherein the call requesting purchase of the product further identifies the vending machine; and wherein the transaction record further comprises an inventory record that indicates that the product has been dispensed from the identified vending machine.

34. The system of claim 33, wherein the communication device is further instructed to transmit the transaction record to a provider of the vending machine for reporting and analysis.

* * * * *

UNITED STATES PATENT AND TRADEMARK OFFICE
CERTIFICATE OF CORRECTION

| | | |
|---|---|---|
| PATENT NO. | : 6,584,309 B1 | Page 1 of 1 |
| APPLICATION NO. | : 09/465359 | |
| DATED | : June 24, 2003 | |
| INVENTOR(S) | : Roger Chris Whigham | |

It is certified that error appears in the above-identified patent and that said Letters Patent is hereby corrected as shown below:

In Column 9, line 14, the portion of claim 14 reading "The method of claim 10" should read
-- The method of claim 13 --

Signed and Sealed this

Twenty-second Day of June, 2010

David J. Kappos
*Director of the United States Patent and Trademark Office*